United States Patent
Scrivner

(10) Patent No.: US 6,594,846 B1
(45) Date of Patent: Jul. 22, 2003

(54) POULTRY CONE CLEANING DEVICE

(75) Inventor: Martin R. Scrivner, Carthage, MS (US)

(73) Assignee: Scrivner Equipment Company, Carthage, MS (US)

( * ) Notice: Subject to any disclaimer, the term of this patent is extended or adjusted under 35 U.S.C. 154(b) by 274 days.

(21) Appl. No.: 09/596,225

(22) Filed: Jun. 15, 2000

(51) Int. Cl.⁷ .............................................. A47L 25/00
(52) U.S. Cl. ........................ 15/88.3; 15/88.2; 15/21.1; 134/6
(58) Field of Search ................................ 15/88.3, 88.2, 15/21.1, 53.3, 77, 97.3

(56) References Cited

U.S. PATENT DOCUMENTS

| | | |
|---|---|---|
| 3,833,966 A | 9/1974 | Harben, Jr. |
| 4,042,993 A * | 8/1977 | Cervin ........................ 15/88.3 |
| 4,385,419 A | 5/1983 | Cantrell |
| 4,602,403 A | 7/1986 | Martin |
| 4,716,624 A | 1/1988 | Massey, Jr. |
| 5,194,035 A | 3/1993 | Dillard |
| 5,231,726 A * | 8/1993 | McKenney et al. .......... 15/88.3 |
| 5,482,503 A | 1/1996 | Scott et al. |
| 5,535,876 A | 7/1996 | Fortenberry et al. |
| 5,588,906 A | 12/1996 | Davis |
| 5,833,527 A | 11/1998 | Hazenbroek et al. |
| 5,930,859 A * | 8/1999 | Ennis ........................ 15/53.3 |
| 5,960,531 A * | 10/1999 | Mora et al. .................. 15/88.3 |

* cited by examiner

Primary Examiner—Robert J. Warden, Sr.
Assistant Examiner—Shay L Balsis
(74) Attorney, Agent, or Firm—Thompson & Knight LLP; Robert C. Hilton

(57) ABSTRACT

The cones used to position poultry carcasses on poultry processing lines must be cleaned frequently. In order to clean the cones, a cone cleaning device is provided. A stainless steel frame holds four rotating cylindrical brushes in position so that the cones can be passed between the brushes. Nozzles spray water on the cones as they pass between the rotating brushes. The brushes are rotated with motors mounted on the frame.

8 Claims, 4 Drawing Sheets

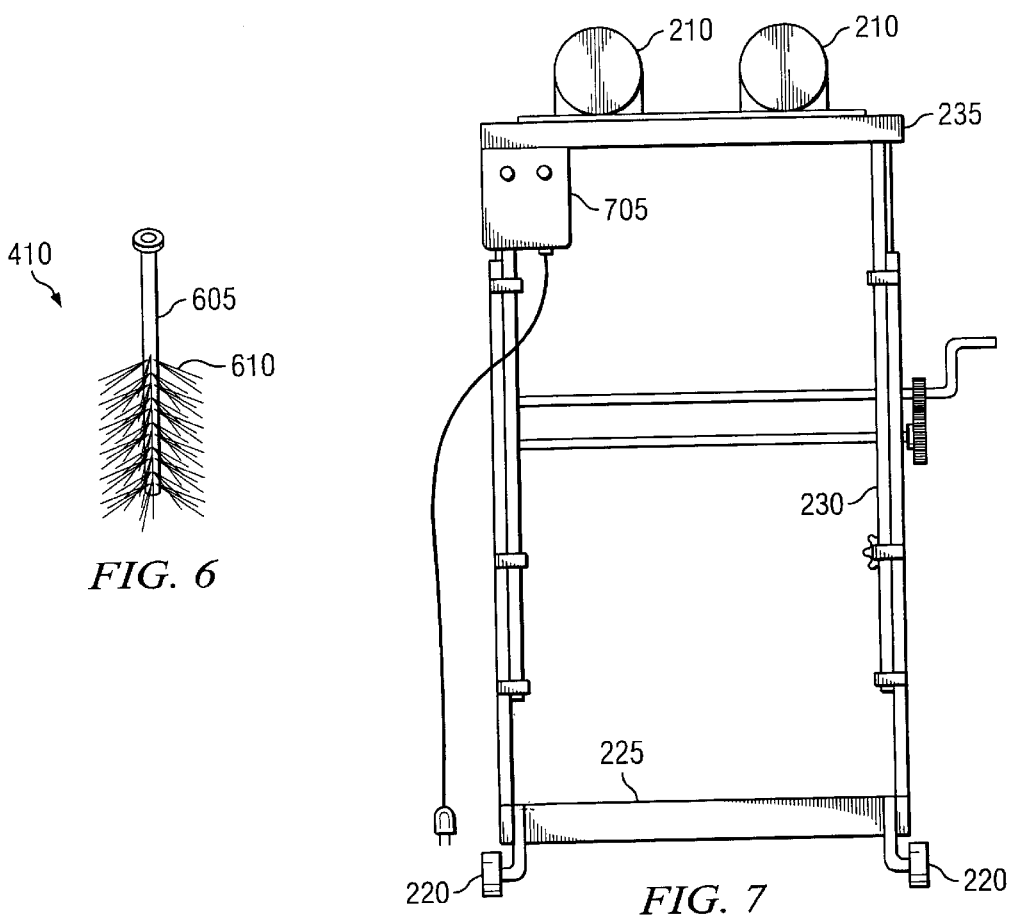
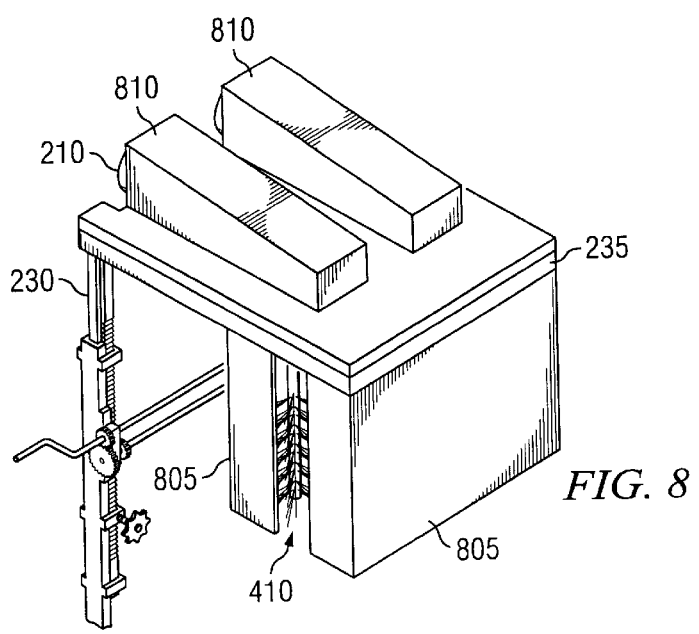

POULTRY CONE CLEANING DEVICE

FIELD OF THE INVENTION

The invention relates to cleaning devices, in particular to a cleaning device for the cones used to debone poultry.

BACKGROUND OF THE INVENTION

The process of poultry preparation has been mechanized by providing a driven conveyor with a series of upright conical supports to position the poultry carcasses for manual or mechanical deboning operations. The cones are inserted into the interior body cavity of the poultry carcass, to hold the poultry carcass stable when the meat is carved from the bones.

Because the poultry is a food product, it is necessary to clean the cone line thoroughly on a periodic basis. The conventional method of washing the cones has been by hand. This use of manual labor, however, is costly and only as reliable as the particular individual doing the cleaning.

What is therefore needed is an efficient, economical and reliable method of cleaning the cones.

SUMMARY OF THE INVENTION

A cone cleaning device is therefore provided that is efficient, economical and reliable.

In accordance with an exemplary embodiment, a stainless steel frame holds four rotating cylindrical brushes in position so that the cones can be passed between the brushes. Nozzles spray water on the cones as they pass between the rotating brushes. The brushes are rotated with motors mounted on the frame.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 6 depicts a brush.

FIG. 7 depicts a rear view of the cone cleaning device including a view of the control panel.

FIG. 8 depicts a view of the cone cleaning device including splash guards.

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
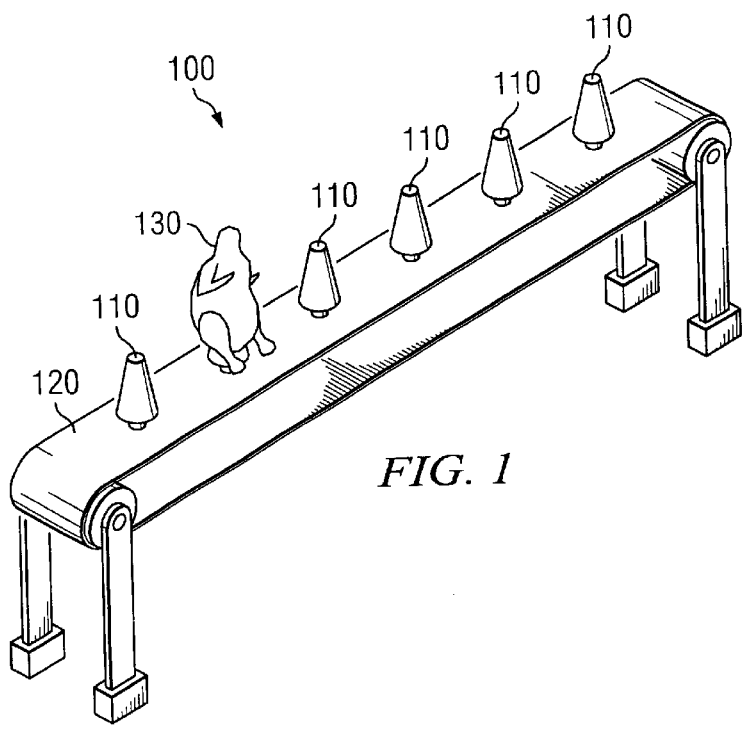
FIG. 1 depicts a conventional poultry processing line.

FIG. 1 depicts a poultry processing line 100, with a series of cones 110 attached to a driven conveyor 120. In operation, poultry carcasses 130 are placed on the upright cones. The conveyor is driven forward, causing the poultry carcasses to progress down the line, allowing the meat to be manually or mechanically removed.

Figure 2:
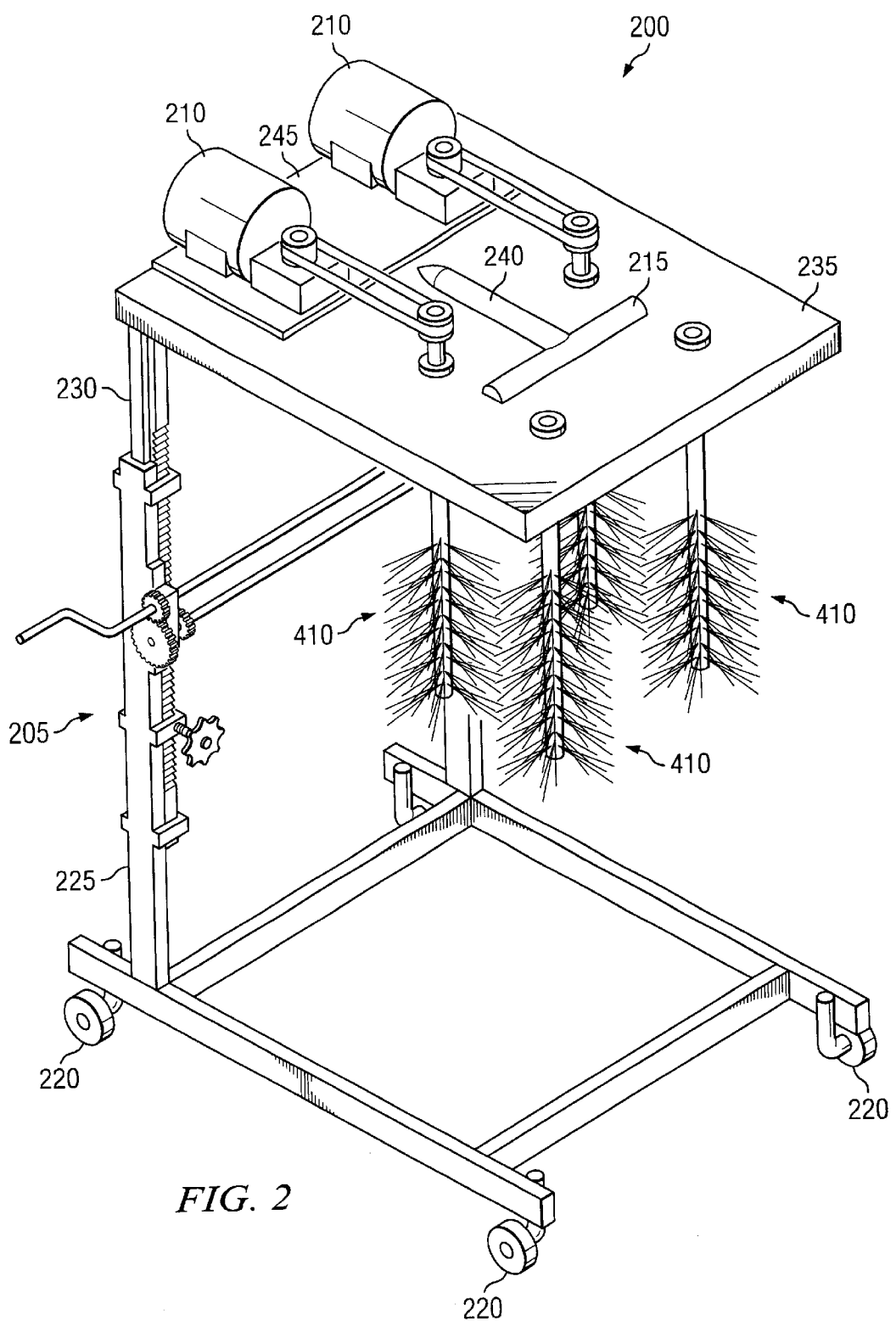
FIG. 2 depicts a cone cleaning device in accordance with an exemplary embodiment of the invention.
Figure 4:
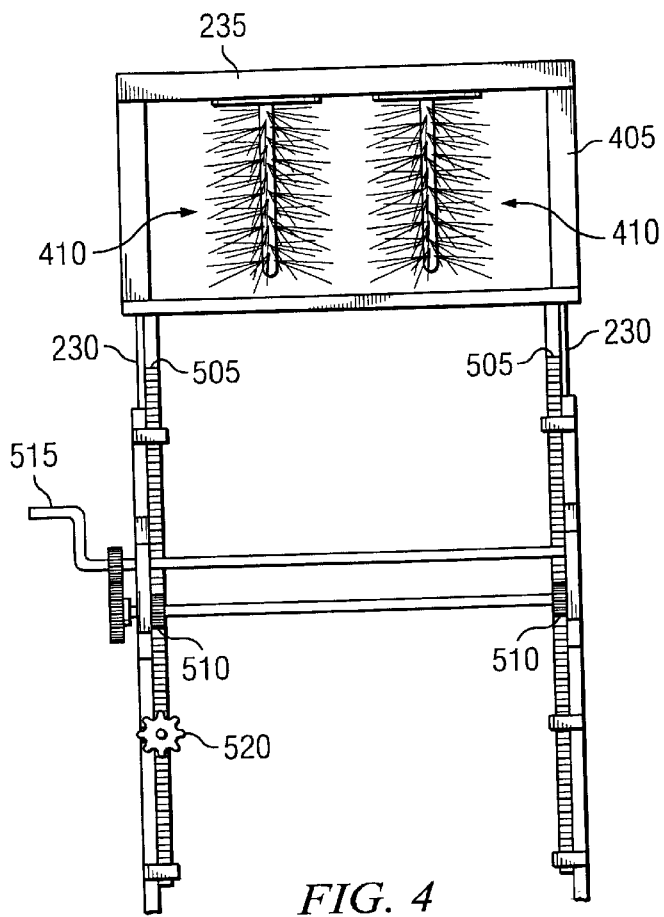
FIG. 4 depicts a front view of the brush frame of the cone cleaning device.
Figure 5:
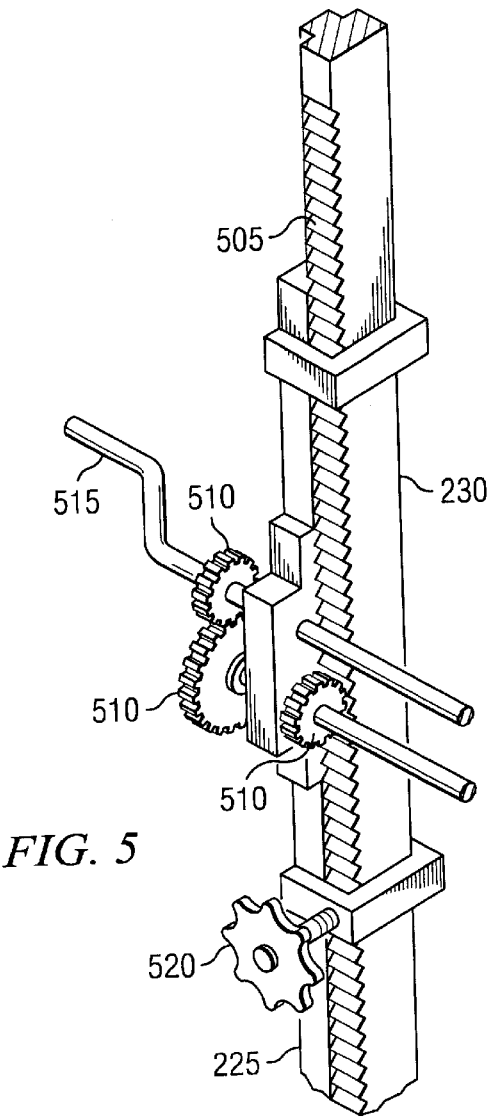
FIG. 5 depicts the mechanism for adjusting the height of the cone cleaning device frame.

FIG. 2 depicts a cone cleaning device 200 including a frame 205 supporting brushes 410, brush motors 210 and a water spray nozzle 215. The frame is preferably made with stainless steel tubing, for reduced weight, strength and resistance to water damage. The cone cleaning device 200 is preferably made mobile by attaching rollers, wheels or casters 220 to the underside of the frame 205, permitting the cone cleaning device 200 to be moved from one poultry processing line 100 to the next. The height of the frame 205 may be made adjustable, so that poultry processing lines 100 of varying heights can be cleaned, as well as to facilitate positioning the cone cleaning device 200 on the poultry processing line 100.

The frame 205 includes a base frame 225, a rear frame 230 and a top frame 235. The base frame 225 is attached to the bottom of the rear frame 230 and extends forward a distance sufficient to provide support for the cone cleaning device 200. The rear frame 230 preferably includes toothed frame rods 505 which engage gears 510 that can be turned to adjust the height of the top frame 235. The gears 510 may be turned with a handle 515. A locking or tightening mechanism 520 may be included to fix the height of the top frame 235 during use. The top frame 235 is attached to the top of the rear frame 230.

The top frame 235 includes two brush frames 405 suspended from the underside of the top frame 235. Each brush frame 405 is preferably sized so that it will hold two cylindrical brushes 410 in a vertical position. A pipe 240 is positioned through the top frame, so that nozzles 215 can spray liquid between the brushes. The top frame 235 includes a motor mount plate 245, for mounting the motors 210 used to rotate the brushes 410.

In the preferred embodiment, four cylindrical brushes 410 are positioned in the brush frame assembly 405 to scrub the cones 110. The brushes 410 are preferably about twelve inches high, along the axis of the cylinder 605. The brushes 410 preferably have nylon bristles 610 about four inches long.

The brushes 410 are rotated with motors 210 mounted on a motor mount 245 on the top frame 235. In the preferred embodiment, two motors 210 are used, each rotating a pair of brushes 410. A control panel 705, to turn the motors 210 on and off is attached to the rear frame 230.

One or more nozzles 215 are positioned on the top frame 235 to spray liquid on the cones 110 as they pass between the brushes 410. The nozzles 215 may introduce water, heated water, or a liquid mixture of water and soap onto the cones 110.

Splash guards 805 may be positioned around the front and back of the brushes 410, to prevent the liquid introduced by the nozzles 215 from being thrown in all directions by the rotating brushes 410. Additional splash guards 810 may be used to further protect the electric motors 210 from damage.

The cone cleaning device 200 is preferably configured so that the device 200 can be positioned to allow the cones 110 of the poultry processing line 100 to pass between the rotating brushes 410.

Figure 3:
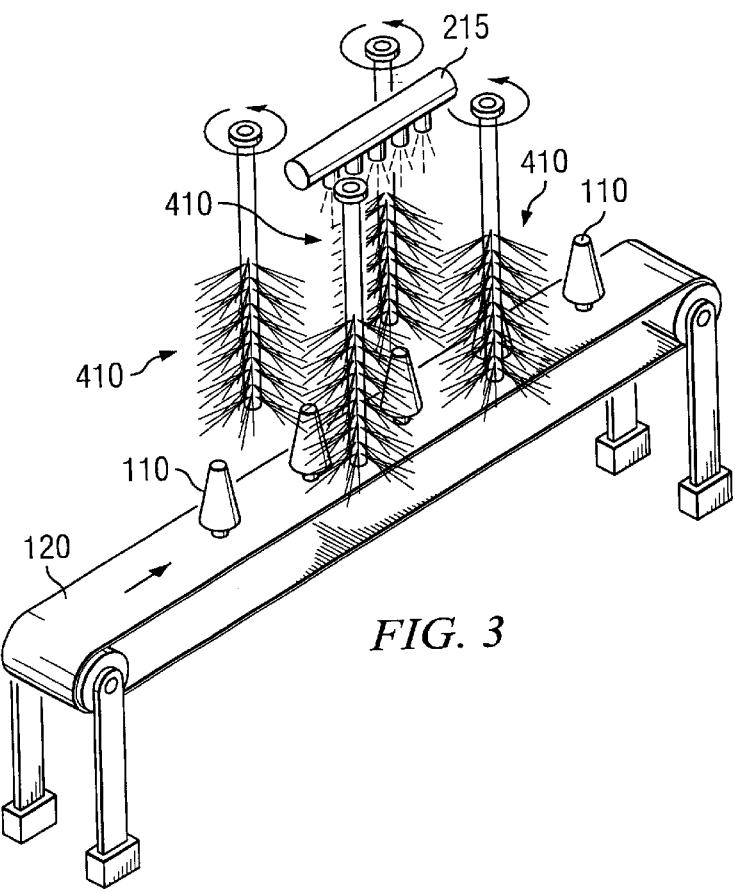
FIG. 3 depicts the cone cleaning device in operation.

In operation, the cone cleaning device 200 is placed adjacent to the poultry processing line 100, so that the cones 110 will pass between the brushes 410, as shown in FIG. 3. Using the control panel 705, the brush motors 210 are turned on, causing the brushes 410 to rotate. The water supply is turned on so that water sprays from the water nozzles 215. The conveyor 120 of the poultry processing line 100 is turned on, so that the cones 110 move between the rotating brushes 410. As the cone 110 passes between the brushes 410, water is sprayed on the surface of the cone 110 as the rotational motion of the brushes 410 causes the bristles 610 of the brushes 410 to scrub the surface of each cone 110. As the conveyor 120 moves the cones 110 forward, each cone 110 is cleaned. Passing each cone 110 through the cone cleaning device 200 multiple times permits more thorough cleaning of the cones 110.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A poultry cone scrubbing apparatus for cleaning poultry cone on a poultry processing line, comprising:

a top frame positioned above the poultry processing line;

at least one brush suspended from an underside of the top frame such that an axis about which the brush rotates is vertically oriented and is substantially parallel to a longitudinal axis of the poultry cone;

at least one motor to rotate said at least one brush;

a nozzle attached to the top frame and being positioned above the poultry processing line;

wherein said brush is placed in contact with said poultry cone; and wherein said nozzle sprays liquid on said poultry cone.

2. A poultry cone scrubbing apparatus as in claim 1, further comprising:

a rear frame attached to the top fame; and wherein the rear frame is adjustable in height.

3. A poultry cone scrubbing apparatus as in claim 1, further comprising wheels attached to the frame.

4. A poultry cone scrubbing apparatus as in claim 1, further comprising rollers attached to the frame.

5. A poultry cone scrubbing apparatus as in claim 1, further comprising four brushes attached to the frame.

6. A poultry cone scrubbing apparatus as in claim 1, wherein said at least one brush is a cylindrical brush.

7. A poultry cone scrubbing apparatus as in claim 1, further comprising two motors to rotate said at least one brush.

8. A poultry cone scrubbing apparatus according to claim 1 further comprising:

a rear frame rigidly attached to the top frame, the rear frame having a toothed frame rod;

a base frame adjustably connected to the rear frame;

at least one gear attached to the base frame, the gear being adapted to engage the toothed frame rod and further being adapted to adjust the height of the rear frame relative to the base frame; and wherein the at least one motor is mounted on the top frame.

* * * * *

UNITED STATES PATENT AND TRADEMARK OFFICE
CERTIFICATE OF CORRECTION

PATENT NO.   : 6,594,846 B1
DATED        : July 22, 2003
INVENTOR(S)  : Martin R. Scrivner It is certified that error appears in the above-identified patent and that said Letters Patent is hereby corrected as shown below:

Column 3,
Line 34, insert -- a -- before "poultry cone on a poultry processing line".

Column 4,
Line 12, the word "fame" should read -- frame --.

Signed and Sealed this

Twenty-eighth Day of October, 2003

JAMES E. ROGAN
*Director of the United States Patent and Trademark Office*